United States Patent
Gfrerrer et al.

(12) 
(10) Patent No.: US 6,543,839 B1
(45) Date of Patent: Apr. 8, 2003

(54) DOOR OR LID FOR A MOTOR VEHICLE AND METHOD FOR THE PRODUCTION THEREOF

(75) Inventors: Johann Gfrerrer, Mittersill (AT); Klaus Hausberger, Graz (AT)

(73) Assignee: Steyr-Daimler-Puch Fahrzeugtechnik, Graz (AT)

(*) Notice: Subject to any disclaimer, the term of this patent is extended or adjusted under 35 U.S.C. 154(b) by 0 days.

(21) Appl. No.: 09/623,580
(22) PCT Filed: Aug. 3, 1999
(86) PCT No.: PCT/AT99/00055
§ 371 (c)(1), (2), (4) Date: Dec. 28, 2000
(87) PCT Pub. No.: WO99/44847
PCT Pub. Date: Sep. 10, 1999

(30) Foreign Application Priority Data

Mar. 6, 1998 (DE) .......................................... 198 09 750

(51) Int. Cl.[7] .................................................. B60J 5/00
(52) U.S. Cl. ..................... 296/146.6; 296/188; 280/751
(58) Field of Search ............................... 296/146.6, 188, 296/189; 280/751

(56) References Cited

U.S. PATENT DOCUMENTS

| | | | |
|---|---|---|---|
| 4,890,877 A | * 1/1990 | Ashtiani-Zarandi et al. | 296/153 |
| 5,536,060 A | 7/1996 | Rashid | 296/146.6 |
| 5,700,050 A | * 12/1997 | Gonas | 296/189 |
| 5,806,889 A | * 9/1998 | Suzuki et al. | 280/751 X |
| 6,302,472 B1 | * 10/2001 | Rahmstorf et al. | 296/146.5 |

FOREIGN PATENT DOCUMENTS

| | | |
|---|---|---|
| DE | 3102329 | 9/1982 |
| DE | 9112280 | 11/1991 |
| DE | 4407731 | 9/1995 |
| EP | 392904 | 10/1990 |
| EP | 530042 | 3/1993 |
| EP | 712746 | 5/1996 |

* cited by examiner

Primary Examiner—Dennis H. Pedder
(74) Attorney, Agent, or Firm—Clark Hill PLC

(57) ABSTRACT

The door of a motor vehicle includes a body and an internal support system. In order to be stiff, light and inexpensive, the support system (8) consists of a double-sided highly rigid body in the form of a plate which is fixed to the inside of the body (1) of the door, and the inside (10) and outside (11) walls of the support system are made of fiber-reinforced plastic, whereby the ribs (30, 42) that run in a longitudinal direction in between them form spaces (31, 32). At least one of said spaces contains a compression-proof filling and the inside (10) and outside (11) walls are connected to each other along their contour (12, 14, 15). Accommodations (20) to receive fasteners are integrated therein to allow the support system (8) to be connected to the sheet-metal shell module (1).

9 Claims, 7 Drawing Sheets

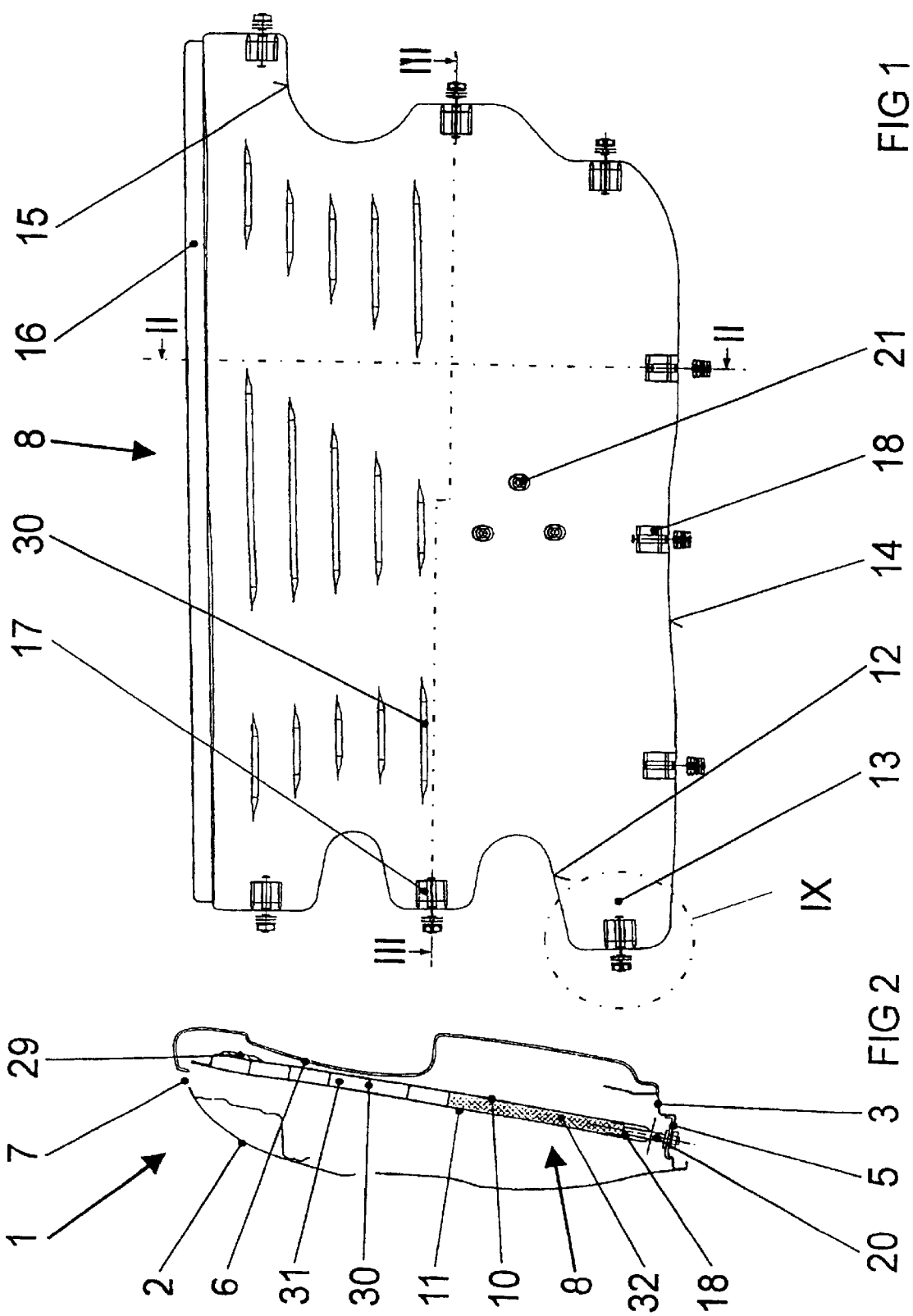

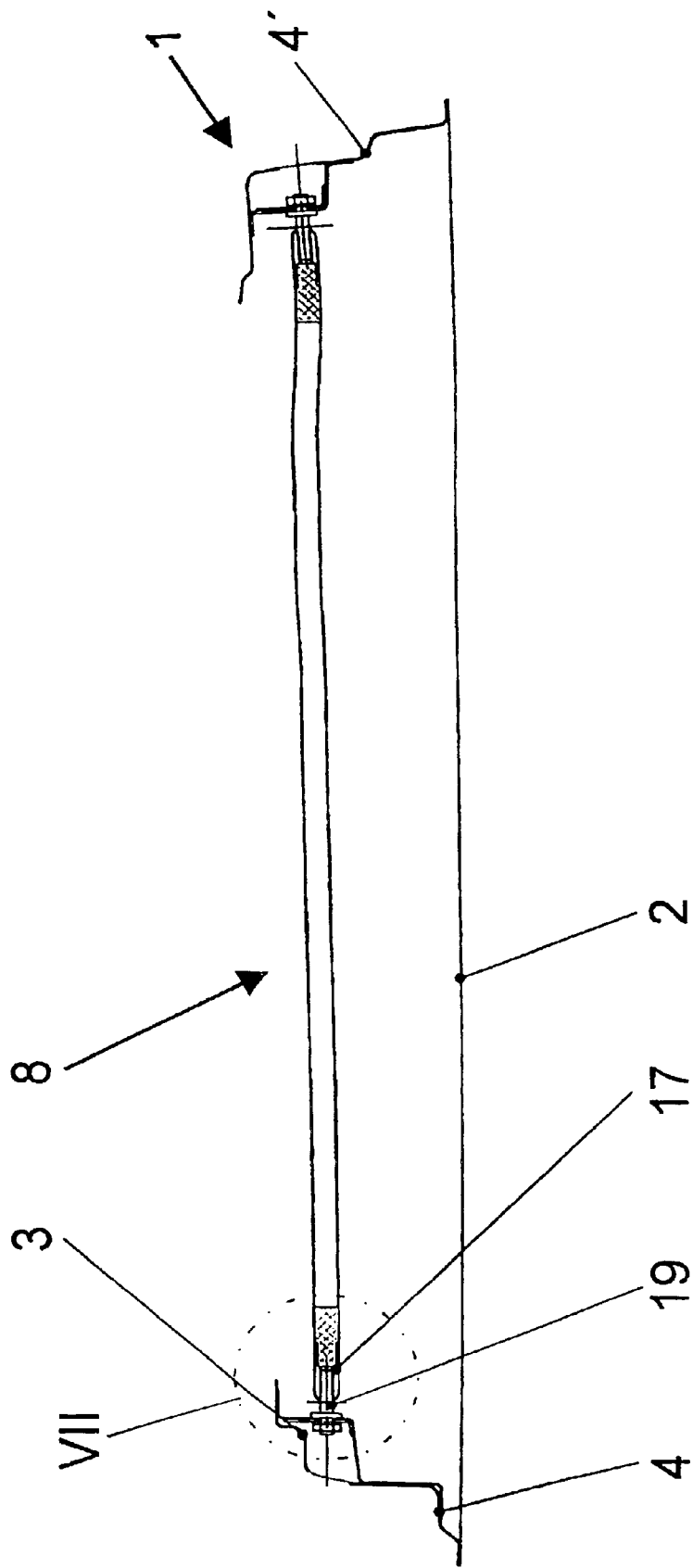

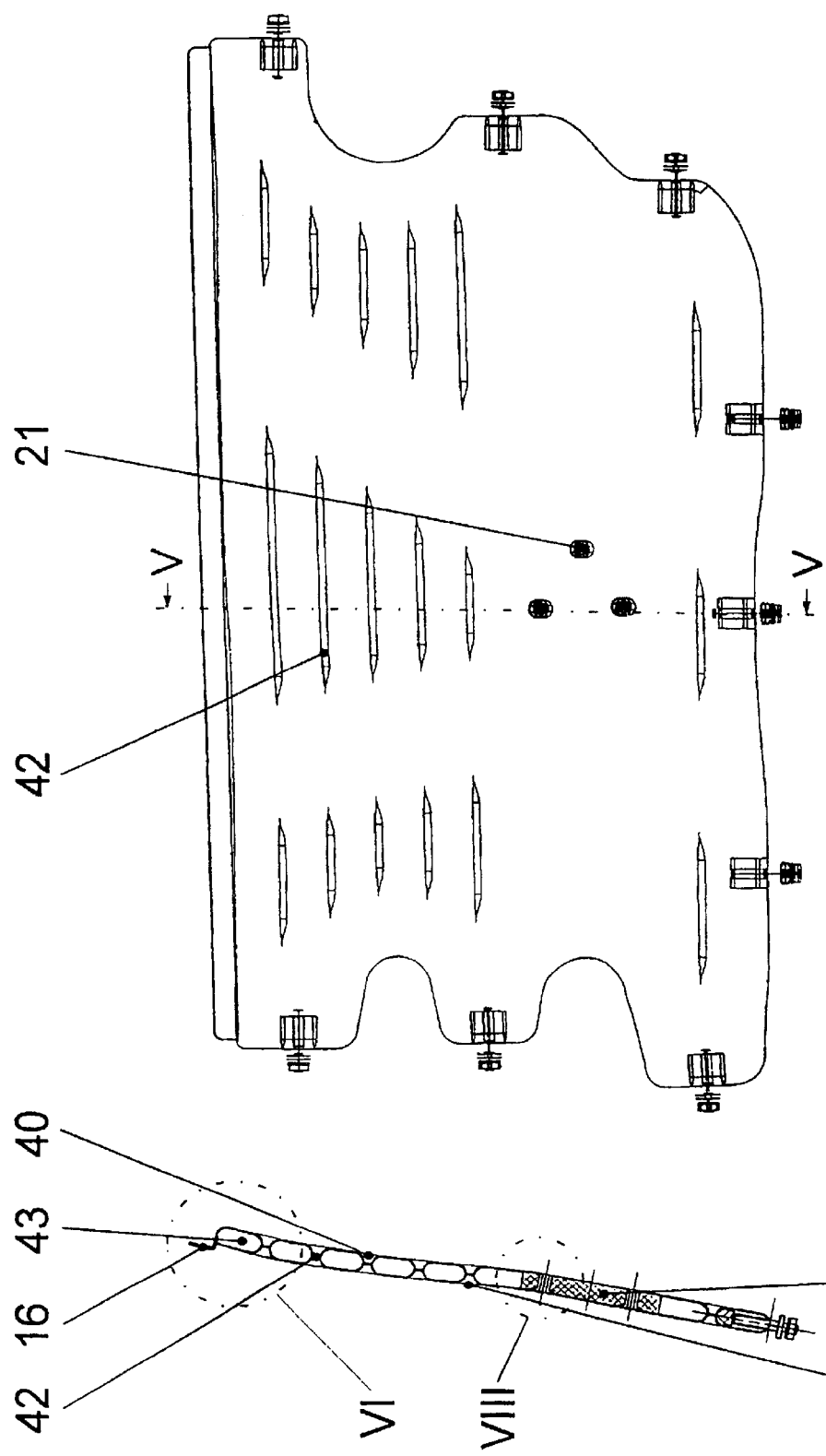

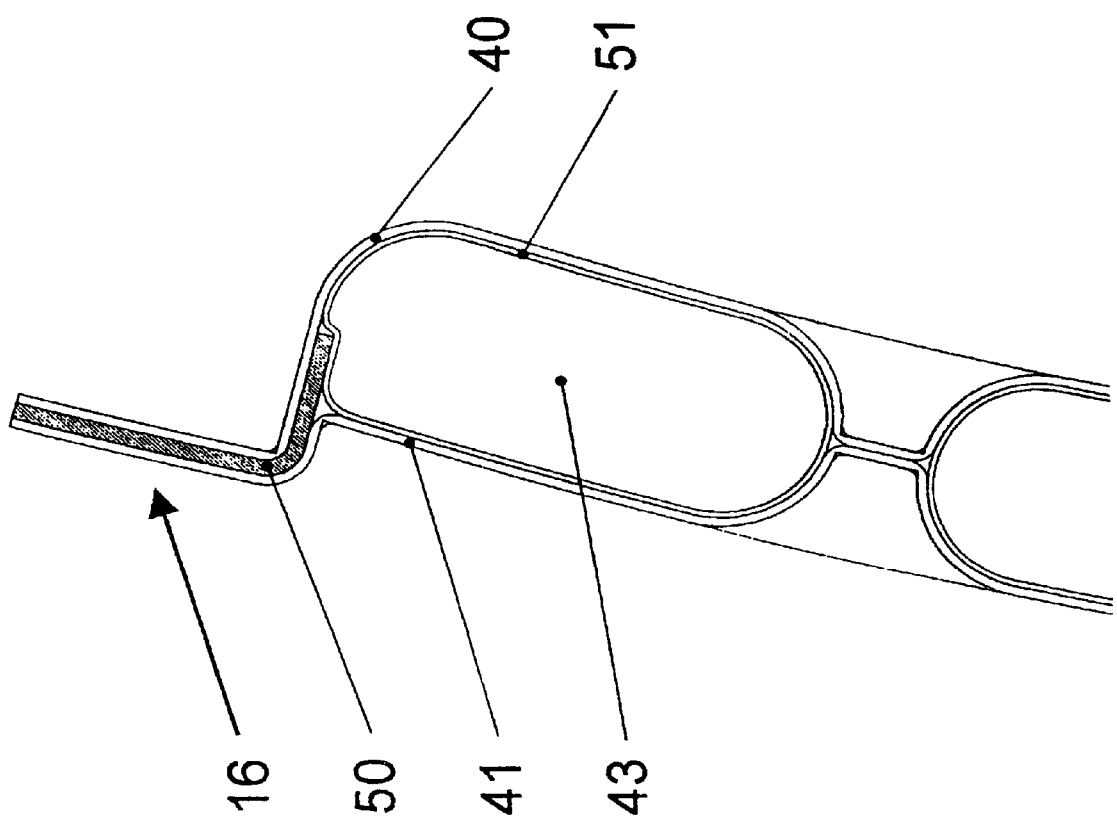

DOOR OR LID FOR A MOTOR VEHICLE AND METHOD FOR THE PRODUCTION THEREOF

FIELD OF THE INVENTION

The invention is a door construction for a motor vehicle which comprises a body and an internal support system. In this case, the door means not only the side doors but also that of the rear flaps and the trunk lid of a motor vehicle.

BACKGROUND OF THE INVENTION

The body of the traditional motor vehicle doors consists mainly of an outer shell and an inner shell, as well as other sheet metal parts for reinforcement and to support auxiliary installations, e.g. window channels and window winders. The inner shell forms the front of the door all around which is joined to the outer shell by means of spot welding. In case there is a door with a window frame, both shells together also constitute the same.

A large area of the inner shell is mostly opened to enable space for the auxiliary installations. Reinforcement supports or reinforcement frames of metal are generally provided as the supporting system, especially for strengthening in case of a collision. However, these are heavy and collide with the window channels, thus insufficient as passenger protection because of their limited effect.

Generally, despite the relatively heavy weight of these types of traditional doors, the specific susceptibility of energy is insufficient, especially the non-fulfillment of the future statutory rules, their rigidity and structure consistency (e.g. when the motor vehicle and the door are distorted), the manufacturing costs are high because of the complex construction and the expensive fastening of the auxiliary installations. The soundproofing and the thermal insulation are also poor.

Door constructions with plastic parts have acquired a reputation. In the DE 4407731 there is a door which consists of two or three shells made of a fiber compound material which are welded to one another. There is a detachable one fastened to this outer shell. The disadvantages of this are the complicated shape of the shells made of a compound material which practically shapes the whole door for the hinges and the lock as well as the efforts involved to establish a connection by applying adhesive or high frequency welding. Despite the supports, the rigidity and the intrusion resistance in case of a side collision affecting the door is insufficient. The detachable outer shell cannot contribute to the reinforcement and the natural stability of the door. In addition, this solution means complete deviation from the usual door constructions which requires the new construction of a door.

In the EP 712 746 A there is a support system for a door which can bear all auxiliary aggregates and can then be fitted into the door. However, it consists of extruded plastic and does not offer any special reinforcement of the door structure.

In the DE 31 02 329 there is a multi-component door by which the center part of the support system comprises the inner and outer plates of the door. The center part of the door has a torsion-proof compound plastic body of a shearing modulus of elasticity which covers a large area with one of its two shells enclosed by a core of rigid expanded polyurethane in which at least one energy absorption body is imbedded. The core of expanded polyurethane gives the compound plastic body a certain rigidity by counteracting bending, using horizontal transverse force, which, however, is insufficient in case of collision. For this reason an energy absorption body is imbedded, the resistance of which has the effect which opposes the core of the rigid expanded polyurethane by an elongation of the bicurve profile diaphragm. Such an elongation and thus the energy absorbing effect—only occurs in the case of collision when there is extreme deflection inside the motor vehicle for which there is no space in the door. Even the extreme thickness of the compound plastic body cannot change this. Therefore it is necessary to use this body as a support of the inner and outer plates of the door. Normally the inner and outer plates of the door support the inner reinforcement. This reverse function requires a complete new development of the entire door and excludes further development of the existing one.

SUMMARY OF THE INVENTION

The invention is thus to be based on the task to propose an especially light door construction which connects the maximum natural rigidity in all directions as well as maximum energy absorption and intrusion resistance by simple mounting of the complete door and does not require to deviate from the traditional basic construction of a door.

This will be achieved in the invention by the following characteristics:

a) fins connected to one another and directed inwards in longitudinal direction on the inner and outer walls b) fins which create spaces, where one of which at least will have a compression-proof filling c) inner and outer walls connected to one another at their contour and where accommodations have been made for fastening by which the support system shall be fastened to the body of the door According to the invention a laminated body will be installed in the traditional body of the door which takes up a large part of the door surface and on which all auxiliary aggregates can be mounted in addition. Such a body is spacious due to its double wall and achieves an especially high bending resistance and torsion rigidity due to the ribs which are directed inwards in a longitudinal direction and which are connected to each other as well as due to the compression-proof filling. Owing to the distribution of percussive power on a larger surface the depth of penetration is kept at a minimum in the case of collision and bends in the zone of pressure is counteracted.

By using fiber-reinforced plastics even the contour, the shape and construction of the inner wall and the outer wall also deviating from the plane surface by arrangement and alignment of the reinforced fiber can be based on the stress and the shape if the respective door and adapted to the position of the fastening points.

Accommodations for fastening will be considered on the contour of the support system where it will not impair the body quite as much and which enables the largest possible distance between the fastening points. Due to the connection along the entire contour, not only will be highest torsion rigidity be achieved, but it will also prevent moisture from entering. As the fastening to the body of the door will only be done at points above the integrated provisions, the forces will be passed on in a controlled manner and installation can be effected simply and without assiduous adjustments, even in one of the traditional door bodies which has been only slightly modified.

In a profitable development of the invention, there will be a light compression-proof core material between the inner and outer walls which can also be sound-proof. Such a material increases the buckling rigidity and the intrusion resistance in case of a collision across the level of the door. This core material can have a honeycomb structure or be of foam. When this is thermally activated, an internal overpressure can be achieved by pressing which further increases the rigidity. The core material can also be of a light wood (e.g. balsa wood), which also has the advantage of being a good sound-proof as well as thermal insulation.

To further improve the collision behaviour the walls in zones exposed to stress could be provided with reinforcements which are orientated and dimensioned accordingly. These could be of metal and also imbedded in the matrix. If the reinforcements are provided with high tensile reinforcement fibers (perhaps of Kevlar), the energy absorption values of deformation will be achieved which satisfy the most stringent requirements of the future or show a very low thickness in case of similar strength.

In one of the favourable designs, threaded bushings whose thread axis is in the longitudinal direction will be provided for fastening. Due to this the fastening points of the body are easy for mounting to the front walls of the body of the door.

Accommodations shall be made for fastening on the points of the hinge joints and the door lock so that the line of force is kept away from the body of the door. If accommodations for fastening are made with lateral shoulders around which the reinforced fiber or prepregs are arranged, which causes direct introduction of force from the fastening means in the fibers without impairing them. This is, still to be demonstrated, important when applying initial stress during manufacture.

The subject of the invention is also a process for the manufacture of doors and covers for a motor vehicle, which shall be effected as follows:

a) Applying prepregs which can be draped and if necessary the reinforcements of the inner and outer walls in the mould b) Placing the core material in the appropriate spaces c) Applying prepregs which can be draped and if necessary the reinforcements of the inner and outer walls d) Placing the accommodations e) Closing of the mould and pressing it together at increased temperature In order to prestress the walls of the support system—like a prestressed concrete bridge—and to enable it to have an especially high rigidity, the holding fixtures will be arranged in a displaced manner and their shoulders will be surrounded by the ends of individual prepregs, after closing the mould tension will be applied on the accommodations from the outside by which these will be brought to the intended position, thereby prestressing the prepregs and the temperature will then be increased.

DESCRIPTION OF THE DRAWINGS

In drawings which illustrate embodiments of the invention,

FIG. 1 is a lateral view of a door with the invented construction from the inside in one of the first designs, FIG. 2 is a vertical view according to II—II in FIG. 1, FIG. 3 is a horizontal view according to III—III in FIG. 1, FIG. 4 is a lateral view of the support system in the invented construction from the inside in a different design, FIG. 5 is a vertical view according to V—V in FIG. 4, FIG. 6 is an enlarged detail view of section VI in FIG. 5.

DESCRIPTION OF THE INVENTION

Figure 7:
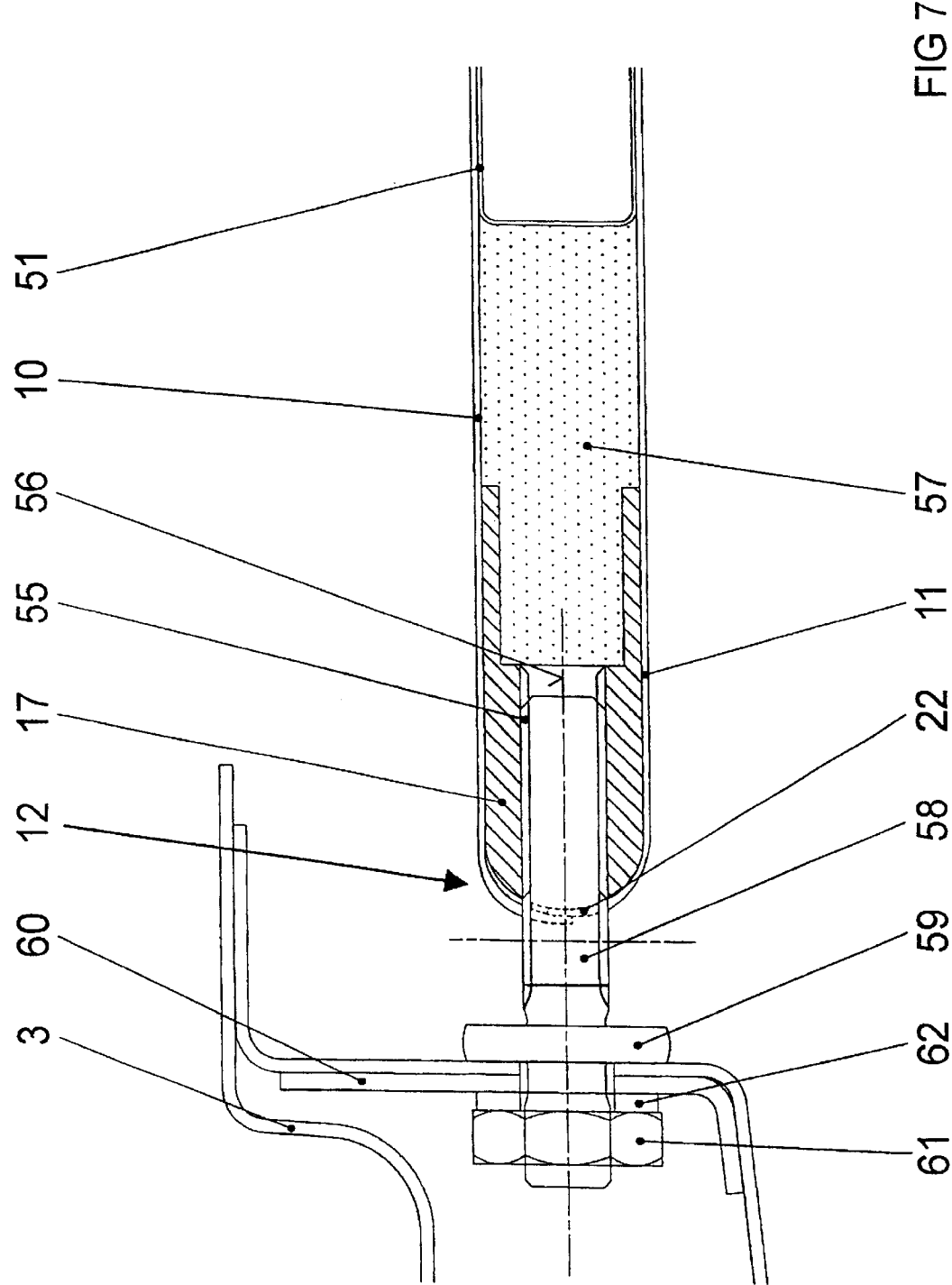
FIG. 7 is an enlarged detail view of section VII in FIG. 3.

In FIGS. 2 and 3 the body of the door is indicated as factor 1. It is generally similar to the body of the traditional door and consists of an outer plate 2, an inner plate 3 and an inner lining 6. One of the two plates 2, 3, in this case the inner plate is folded at right angles (outwards) and connected to the other plate, mostly by spot-welding. The folded parts form front walls 4 (at the front) and 4 (at the rear), refer to FIG. 3, and a bottom 5, refer to FIG. 2. Between the outer plate and the inner plate 2, 3, a slit 7 can be provided as the opening for a collapsible window which has not been illustrated.

The invented support system is shown at 8. This is a laminated box with the contours adjusted to the shape of a door. It is arranged between outer plate 2 and inner plate 3, on the front walls 4, 4 and fastened to the bottom 5 and stretches essentially over the entire lower part of the door or trunk lid of the motor vehicle that has no window.

In FIGS. 1, 2, and 3 the shape of the support system can be viewed. It includes essentially an inner wall 10 and an outer wall 11, whose contour is formed by a front edge 12 with flaps 13, a bottom edge 14, a rear edge 15, and an upper edge 16. Both walls 10, 11 are connected with each other along the contours 12, 14, 15. At various points of contours 12, 14, 15, accommodations 17, 18 have been made. Accommodations 17 are provided in flap 13 near to the hinges of the door which have not been illustrated. They incorporate fastening means 19 with which they are fastened to the body of the door 1. In the same way accommodations 18 are provided at bottom edge 14 which incorporate fastening means 20 to connect to bottom 5 of the body of the door 1.

Furthermore, inserts 21 (FIG. 1) for diverse mechanical or electrical components of the door, e.g. for a window lifter which has not been illustrated, are provided in support system 8. Walls 10, 11 consist of fiber-reinforced duromeres or thermoplasts which are available as prefabrications in the form of prepregs, preferably prepregs which can be draped, or as wet laminate. These have a volume content of fiber of 40 to 70% by which the fibers are orientated in certain directions (e.g. 0°, 90°, +30°, −30°, +45°, −45°). These prepregs will be applied according to their size and direction of the expected stresses so that there is formation of anisotropic laminate. If the mould of walls 10, 11 deviates from the even moulds, the prepregs will be laid into the appropriate mould by which their draping capability will be proven useful.

Plastic fibers, glassfibers, aramide fibers, Kevlar fibers, basalt fibers, thermoplastic fibers or mixed fibers will be applied. They could be prestressed. Thermosetting resins, e.g. epoxyd resin (EP), polyester resin (UP), vinylester resin (VE) or phenol resin (PF), will be applied as polymeric plastic matrix. Suitable thermoplastic matrix materials are polyetherketon (PEEK), polyethersulphonate (PES), polypropylene (PP) or poliimide or polyamide with an extremely high elongation. The permanent and stable connection of all components is created during the pressing process by applying the resin contained in the prepregs. The own resin is not necessary because the prepregs stick themselves during the pressing process at increased temperature.

Additional reinforcements of metal or reinforcement layers 29 with special fibers (FIG. 2) can be provided at heavily stressed points. Both walls 10, 11 show, preferably the longitudinal ribs in the upper region of the support system, which connect with each other during the pressing process, which especially increases the torsional rigidity and by which spaces 31, 32 are created. The ribs could be continuous or intermittent. At the upper part there are tight spaces 31 which are tightly closed and for this reason can be filled with a medium that is under pressure or another compression-proof material. At the bottom part there is space 32 which is filled with the core material. Spaces 31 at the upper part can also be filled with a core material to create a sandwich-type structure.

This core material is compression-proof in the direction across to the support system and either of a honeycomb structure or a foam; light metals foamed as foam, hardened plastic foams or foams which could be thermally activated. The latter produces overpressure in its space under increased temperature during the pressing process. Balsa wood is also suitable. All these core materials increase the rigidity, the specific deformation energy and the intrusion resistance; non-metallic foams also offer the advantage of thermal and sound-proof insulation.

The design mould of FIGS. 4 and 5 differs only from the above in that the inner wall 40 and outer wall 41 have the joined creases 42 available instead of rib 30 to the continuous and intermittent ribs during the pressing process between which spaces 43 of the rounded cross-section is created. The lower space 44 is filled with a core material just as in the previous design example.

FIG. 6 shows the enlarged rounded cross-section of space 43. Tube 51 of compression-proof material, filled with fluidum, gas or liquid which is under pressure, will be inserted into this space. For this purpose either a filled pipe will be inserted during the forming process or the pressure liquid will be inserted into the pipe from the outside through a thin tube, which will be clamped like a navel string when both walls are pressed.

In the same way space 43 can be filled with a foam which can be thermally activated which reacts further by increase of temperature during the pressing process and through that also creates an inside overpressure. It is also possible to insert the foam-forming components first into the press. It can also be seen in FIG. 6 that both walls 40, 41 are joined together via chamber 43 below the intermediate layer of reinforcement 50 which can be of light metal, wood or plastic, thus forming the contour of the support system at upper edge 16.

FIG. 7 shows accommodation 17 in detail at the upper edge of the support system by which inner wall 10 and outer wall 11 are connected with each other. Accommodation 17 is firmly connected with the support system, joined to the fibers and the prepreg in a way yet to be described. It has a thread 55, the axis of which 56 lies essentially at the level of the support system and is followed at the right-hand side first by foam pad 57 and in the example with pipe 51 which is filled with pressure. Screw bolts 58 are fitted in thread 55 as a connecting system. Its band 59 is located at the side of the reinforcement plate 60 of inner plate 3 of the body of the door 1. Nut 61 and safety disc 62 will be provided for this purpose. The support system can be initially tensioned slightly by using screw bolts 58.

Figure 8:
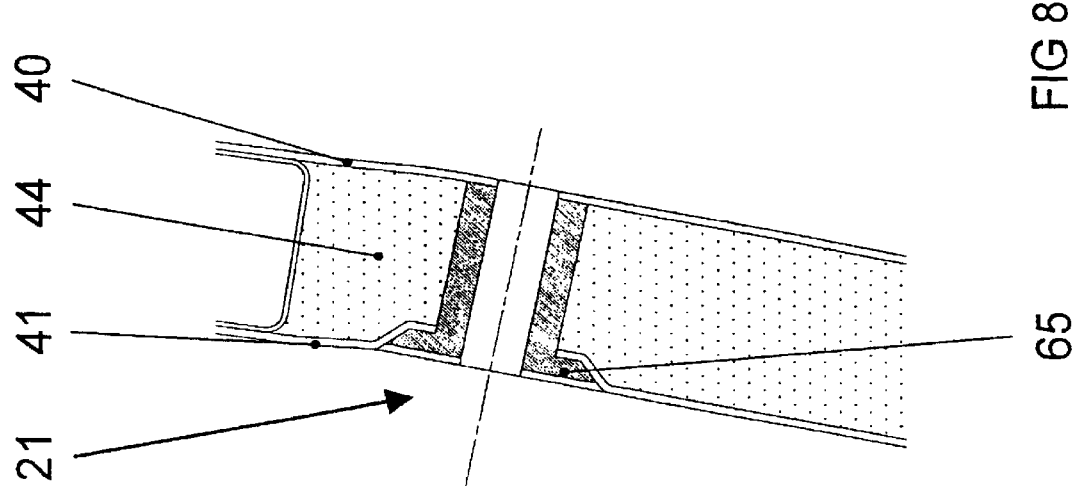
FIG. 8 is an enlarged detail view of section VIII in FIG. 5.
Figure 11:
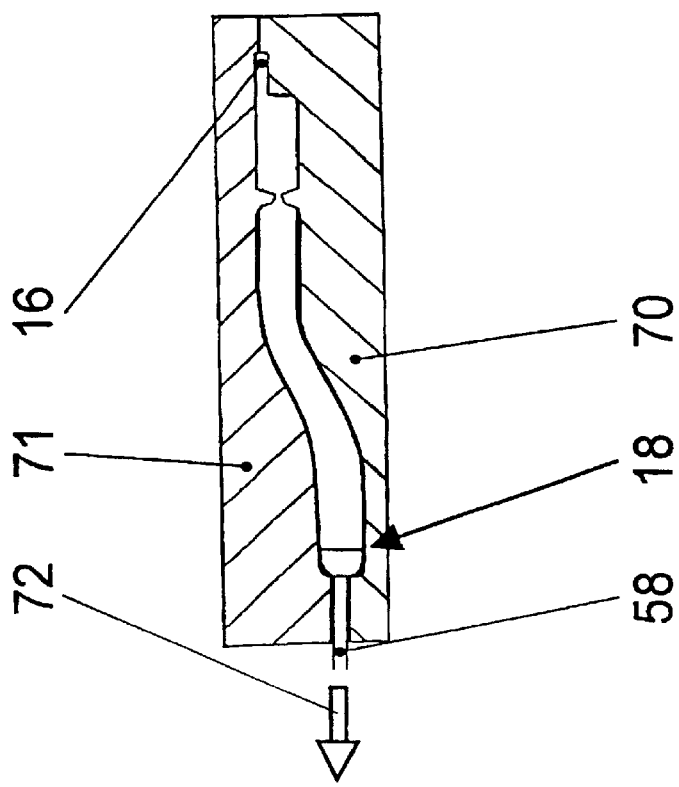
FIG. 11 is a schematic view of the process of FIG. 10 in a second phase.

FIG. 8 shows finally insert 21 in detail which is inserted in support system 8 prior to the pressing process. For this purpose they are provided at least at one side with a flat-head screw 65. Space 44 enclosing it is filled with one of the described core materials.

Figure 9:
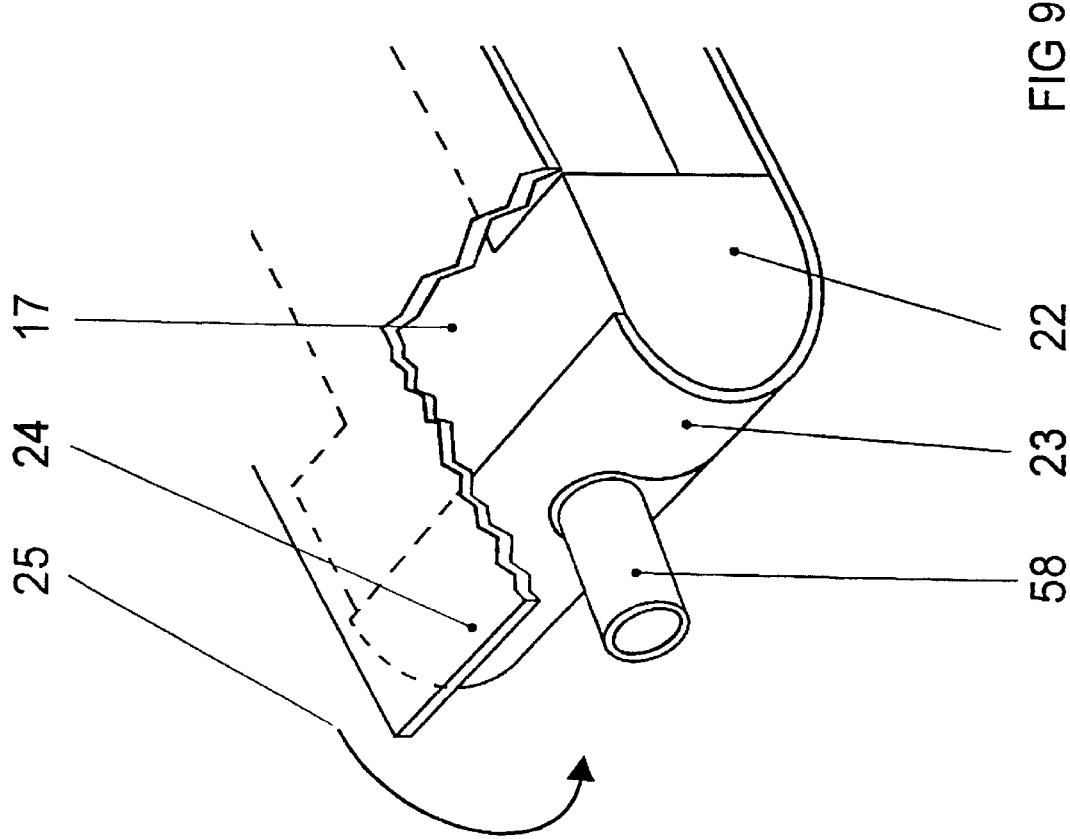
FIG. 9 is an axonometric representation and detail view of section IX in FIG. 1.

FIG. 9 shows how accommodation 17 is connected with the fibers and the prepreg. The accommodation shows lateral shoulders around which ends 23, 24 of the prepregs are enclosed, first the lower 23 and then above the upper 24 (Arrow 25). A hole 24 can be provided for screw bolt 58.

Figure 10:
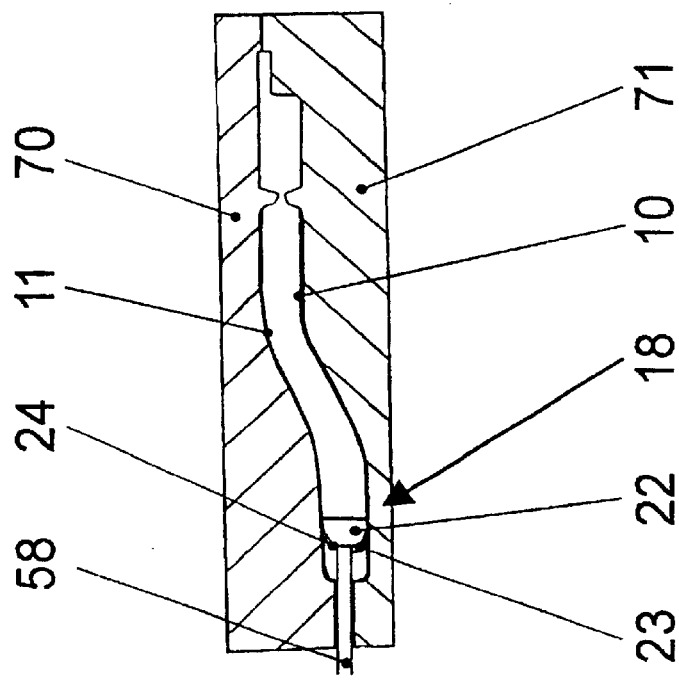
FIG. 10 is a schematic view of the manufacturing process in a first phase.

Manufacture of support system 8 will be effected according to the known prepreg moulding process in one of the existing moulds out of the upper part 70 and lower part 71, by which however prestressing is achieved in a special simple way. During the forming process, accommodations 17, 18 will not be placed in their positions, instead, as shown in FIG. 10, pushed a little to the back. After this ends 23, 24 of the prepregs will be enclosed around the shoulders of accommodations 17, 18. Moulds 70, 71 will then be closed, screw bolt 58 fixed and a tension applied (Arrow 72). Due to this the accommodations will be pushed towards the outside to the area provided for that purpose where the fibers will be prestressed. This happens to all accommodations 17, 18 at the same time.

The above-described embodiment of the invention is intended to be an example of the present invention and alterations and modifications may be effected thereto, by those of ordinary skill in the art, without departing from the scope of the invention.

What is claimed is:

1. A door for a motor vehicle having a body of a door which comprises an inner plate and an outer plate as well as a support system (8) which is a fastened double wall laminated body with an inner wall (10, 40) and outer wall (11, 41) of fiber-reinforced plastic and connected to each other along its contour, characterized by a) said inner and outer walls having ribs (30, 42) in a longitudinal inward direction which are connected to each other;

b) rib spaces (31, 32, 43, 44) of which at least one is provided with a compression resistant filling core material;

c) said inner wall (10, 40) and outer wall (11, 41) on its contour (12, 14, 15) connected to each other and accommodations (17, 18) provided on the common contour for fastening means, by means of which said support system (8) is fastened in the body of the door.

2. The door for a motor vehicle according to claim 1 is characterized by the spaces (31, 32, 43, 44) between the inner wall (10, 40) and the outer wall (11, 14) include said compression resistant core material.

3. The door for a motor vehicle according to claim 2 is characterized by the fact that the core material is a metallic or polymer foam.

4. The door for a motor vehicle according to claim 3 are characterized by core material consisting of a polymer foam which can be thermally activated.

5. The door for a motor vehicle according to claim 1 are characterized by the walls (10, 11) in heavy stress zones being provided with reinforcements.

6. The door for a motor vehicle according to claim 5 are characterized by said core material consisting of light wood.

7. The door for a motor vehicle according to claim 1 are characterized by said accommodations (17, 18) on the contour (12, 14, 15) of the body which are provided with threaded bolts of thread axis (56) bolted in the connecting elements (58) to the body of the door (1).

8. The door for a motor vehicle according to claim 7 are characterized by the accomodations (17) being provided at the points of hinges and door locks and have lateral shoulders (22) surrounded by the ends (23, 24) of prepregs of the inner and outer walls (10, 11, 40, 41).

9. The door for a motor vehicle according to claim 1 are characterzied by the fibers of the inner wall (10, 40) and/or the outer wall (11, 41) being prestressed.

* * * * *